United States Patent [19]

Treloar et al.

[11] Patent Number: 4,502,701
[45] Date of Patent: Mar. 5, 1985

[54] SEALING ASSEMBLY IN FLUID COUPLING

[75] Inventors: Howard A. Treloar; Robert W. Gilbert, both of Adelaide, Australia

[73] Assignee: Mining Supplies (MINSUP) Pty. Ltd., Edwardstown, Australia

[21] Appl. No.: 482,340

[22] PCT Filed: Jul. 7, 1982

[86] PCT No.: PCT/AU82/00106
§ 371 Date: Mar. 25, 1983
§ 102(e) Date: Mar. 25, 1983

[87] PCT Pub. No.: WO83/00543
PCT Pub. Date: Feb. 17, 1983

[30] Foreign Application Priority Data

Jul. 31, 1981 [AU] Australia ............................... PF0020

[51] Int. Cl.³ ................................................ F16J 15/34
[52] U.S. Cl. ................................. 277/92; 277/188 R; 285/73; 285/352
[58] Field of Search .................. 277/92, 188 R, 188 A; 285/73, 74, 352, 336

[56] References Cited

U.S. PATENT DOCUMENTS

| 2,132,506 | 10/1934 | Allen | 285/73 |
| 2,154,914 | 4/1939 | O'Day | 285/73 |
| 2,641,272 | 6/1953 | Seale | 285/352 |
| 3,442,515 | 5/1969 | Murauskas | 277/92 |
| 4,256,315 | 3/1981 | Larson et al. | 277/92 |

Primary Examiner—Robert I. Smith
Attorney, Agent, or Firm—Robert E. Burns; Emmanuel J. Lobato; Bruce L. Adams

[57] ABSTRACT

A compound sealing ring for fluid couplings comprises an annular resilient seal member having front and rear ends between which extends a circumferential annular groove, and an annular rigid reinforcement member inserted over the front end of the sealing member in snug engagement in the groove. The reinforcement member is axially confined by the sidewalls of the groove and has sufficient rigidity to prevent radial outward deformation of the sealing member during use.

11 Claims, 5 Drawing Figures

U.S. Patent       Mar. 5, 1985       4,502,701
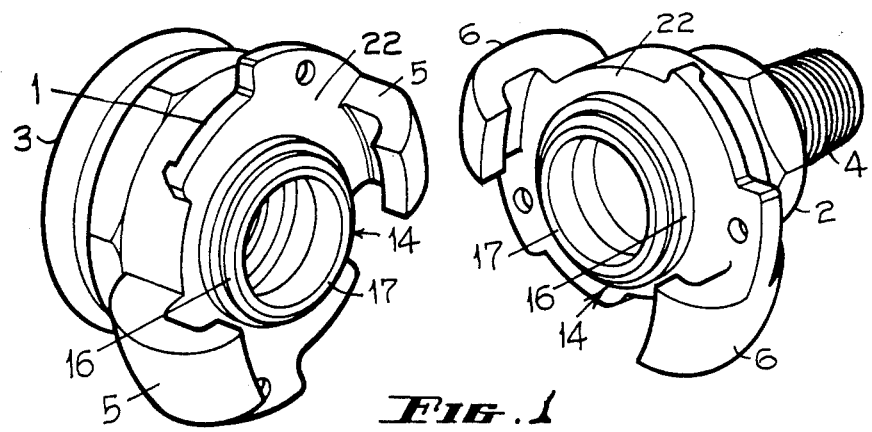
FIG. 1
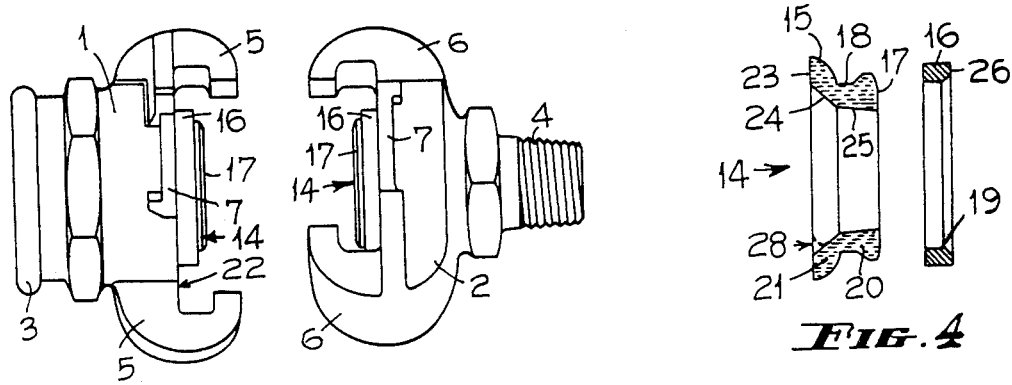
FIG. 2
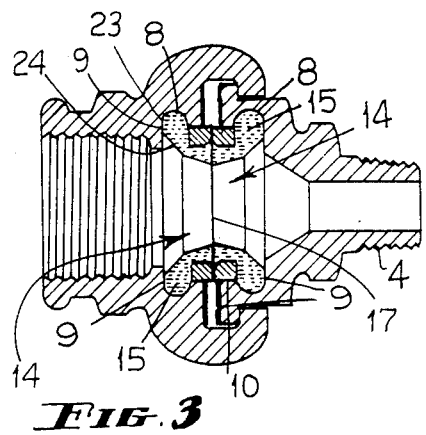
FIG. 3
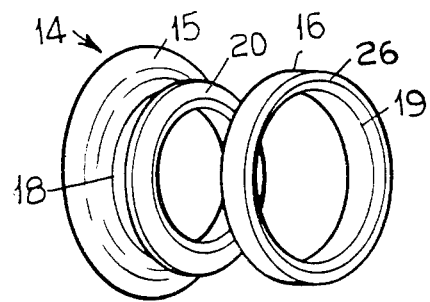
FIG. 4
FIG. 5

SEALING ASSEMBLY IN FLUID COUPLING

This invention relates to an improved fluid coupling and in particular it relates to a coupling of a type which can be attached to the end of a hose or a pipeline to allow the hose or pipeline to be coupled to a supply source or to another hose or pipeline, the coupling generally being of the snap action type and allowing for a resilient sealing ring at the face of the coupling adapted to engage a similar resilient sealing ring at the face of the member to which the coupling is being engaged.

In couplings of this type it has been customary to provide shaped lugs on a body which is adapted to be attached to the hose or pipeline and these lugs co-operate with sections of an adjoining coupling member to lock the two coupling members together axially when engaged, both members preferably being identically formed with lugs to engage the other member and with locking means to ensure that the couplings will not disengage at inappropriate times.

It is usual to form the rings in such couplings to fit into an annular recess formed in the end of the coupling near its front face, that is a face which is in use positioned adjacent to the corresponding face of the member to which coupling is being effected, the resilient member being in the form of a ring which protrudes beyond the front face of the coupling so that when two couplings are interengaged the resilient faces are pulled tightly together to form a seal at the joint.

One of the problems with couplings of this type is that when at low pressure they tend to leak unless correctly constructed and similarly when used at high pressure the resilient rings distort at the interengaging faces to allow the high pressure fluid to leak between the faces because in actual fact these rings become relatively fluid under high pressure and the material can either distort or flow out through the gap between the two faces of couplings being joined.

The object of the present invention is to provide certain improvements to couplings which will overcome both of the above disadvantages.

A further object is to provide a simple and effective construction which will be usable for both high and low pressure fluids and which will give an effective seal in both cases.

A further object is to provide an effective seal for the commonly known types of snap action couplings which have interengaging lugs to hold them together and depend on the pressure exerted on the two interengaging sealing rings to prevent leakage past the rings.

The objects of the invention are achieved by having the body of the coupling constructed as heretofore with an internal annular recess adjacent to the front face of the unit, and positioning in this annular recess a novel compound sealing ring shaped to engage the annular recess but to extend beyond the front face of the coupling, and placing over the projecting front face of a sealing portion of the compound sealing ring a rigid reinforcement portion of metal or the like which surrounds the resilient sealing portion at the area at least where it projects beyond the front face of the coupling so that when two such couplings are axially fitted together to apply the necessary pressure on the resilient sealing portions, the rigid reinforcement portions similarly are in close proximity or contact at their front faces to encase the projecting parts of the resilient sealing portions and prevent outward displacement when high pressure fluid is applied to the coupling, the resilient sealing portions being shaped to act somewhat as a diaphragm to allow the interengaging faces to accommodate themselves as the couplings are joined and during engagement carrying the rigid reinforcement portions with the front part of the resilient sealing portions to compensate for changes in dimension or irregularities in the lugs and interengaging members of the couplings.

To enable the invention to be fully understood an embodiment thereof will now be described with reference to the accompanying drawings in which:

FIG. 1 is a perspective view of a pair of separated complementary coupling members showing the compound sealing rings in position, FIG. 2 is a side elevation of such a pair of coupling members ready to be interengaged and locked, FIG. 3 is a central longitudinal section of a pair of couplings interengaged to show how the rigid reinforcement portions are forced into close proximity to bridge the gap between the facing surfaces of the body of the coupling members, FIG. 4 is a sectional side elevation of a compound sealing ring with the two sections thereof separated, and FIG. 5 is a perspective view of the compound sealing ring shown in FIG. 4.

The two fittings comprises bodies 1 and 2 having tails 3 and 4 adapted to engage in the one case showing the threaded end of a pipeline and in the other case a hose. The fittings are constructed according to well known principles and have hook-shaped lugs 5 and 6, the lugs 5 of the body 1 engaging shaped flanges 7 of the body 2 and the lugs 6 of the body 2 engaging the flanges 7 of the body 1.

Each fitting has in it an internal annular recess 8 which curves from a rear face 9 to a cylindrical part 10, and each ring has in this annular recess 8 a compound sealing ring 14 having a resilient sealing portion or member 15 and a rigid reinforcement portion or member 16.

The resilient part of each ring has a diameter such that it projects through the opening at the front face of a coupling defined by the cylindrical part 10 and expands outwardly in the annular recess 8 in the coupling to seat at its rear face on the rear face 9, which rear face 9 is of larger diameter than the engaging faces 17 of the resilient sealing portions 15 so that pressure on the engaging faces 17 of the resilient sealing portions 15 of the compound sealing rings 14 can allow this part of the ring to move reawardly because of its smaller diameter in relation to the diameter of the resilient sealing portion 15 at the point where it seats on the rear face of the circular recess.

To retain the rigid reinforcement portion 16 in position on the resilient sealing portion 15 of the compound ring 14, that part of the resilient sealing portion 15 which projects through the cylindrical part 10 in the face of the coupling itself has an inwardly positioned flat V-shaped circumferential groove 18 around its periphery and the rigid reinforcement portion 16 is correspondingly shaped on its inside with a flat V-shaped configuration having an outwardly expanding inner surface 19, the complementary configuration ensuring that when the rigid reinforcement portion 16 is pushed into position axially on the end of the resilient sealing portion 15 of the compound ring 14 it will be retained in that position.

In its preferred form the resilient sealing portion 15 of the compound ring 14 has an L-shaped cross-section with an outwardly directed part 20 terminating in the front face 17 which makes contact with the adjacent compound ring 14 when the coupling is in use, and a radially extending part 21 which is adapted to fit into the circular recess 8 extending into the body 1 adjacent to its front face 22. The radially extending part 21 has a flat face 23 (until pushed into the annular groove 8) at its rear on that part of the radially extending part 21 which is outward from the outwardly directed part 20, with a rear face having an inwardly sloping portion 24 joining an inner face 25 of the outwardly directed part 20.

In this way the radially extending part 21 can be accommodated in the annular recess 8 to firmly locate the compound ring 14 in the coupling with the outwardly directed part 20 projecting through the aperture in the front face 22 of the body 1 a sufficient distance to make a seal with the ring of the co-operating coupling member. The front face 26 of the upstanding part of the compound sealing ring is slightly outwardly domed to provide contact with the corresponding ring of the member to which the coupling is joined, this form giving a good seal under low pressure by localising the contact to a narrow circular area around the resilient sealing portion 15 of the compound ring.

The outer face of the outwardly directed part 20 of the resilient sealing portion 15 has, as stated earlier, a shallow V-shaped groove 18 in it to accommodate the rigid reinforcement portion 16 so that the compound sealing ring 14 is axially held in position but the rigid reinforcement portion 16 can move with the resilient sealing portion 15 in an axial direction when the coupling is engaged to ensure that under high pressure, when the front faces 17 of the resilient sealing portions 15 are distorted to a relatively flat shape, as shown in FIG. 3, the rigid reinforcement portions 16 of the two units being in close proximity or in contact to close off the space between the front faces 22 of the two interconnected couplings against outward movement of the resilient sealing portions 15 through the gap between these two front faces 22 which otherwise must of necessity exist.

While reference has been made to flat V-shaped faces it will be realised that an arcuate or other form can be used without departing from the spirit of the invention which resides in the reinforcement of a resilient sealing portion 15 of a compound ring 14 by a rigid reinforcement portion 16 of metal at the location where the resilient portion 15 of the compound sealing ring 14 projects beyond the front engaging face 17 of the coupling member body 1 in which the seal is used to thereby ensure that extremely high pressures can be applied without the material of the resilient sealing portion 15 being able to undergo radial outward deformation or flow outwardly through the space between the two interengaged coupling members.

A radially extending part of the resilient sealing portion 15 can be shaped to ensure an effective seal against flow around the outer face of this part to the aperture in the coupling member such as by feathering a part as shown dotted at 28 to cause pressure to force this part tightly against the wall of the circular groove, or circumferential labyrinth channels could be included on this face of the resilient sealing ring in a manner already known but usually this is unnecessary because at low pressure the fit of the resilient sealing portion 15 is such that it forms an effective seal between the periphery of the radially extending part and the annular recess 8, which seal increases with increases in pressure while the seal generally between a pair of such couplings is increased because of the particular cross-section of the resilient sealing portion 15 which forces the outwardly directed part 20 of the resilient sealing portion 15 outwards to increase contact between the faces of the complementary resilient sealing portions 15 and at the same time ensures that the rigid reinforcement portion 16 is also urged outwardly to ensure that the front faces 26 of the rigid reinforcement portions 16 remain in close spacing to seal off any gap through which the material of the resilient sealing portion 15 could otherwise be forced at these high pressures.

It will be realised that the configuration described need not be adhered to rigidly as it can be modified according to the use of the coupling providing its diaphragm action and its support by a rigid reinforcement ring is adhered to.

For the purposes of assembly the rigid reinforcement portion 16 is separate from the resilient sealing portion 15 so that the resilient sealing portion 15 can be folded and compressed to position it in the annular recess 8 in the coupling, and the rigid reinforcement portion 16 can then be pushed over the outwardly directed part 20 of the resilient sealing portion 15 to extend into the coupling through the aperture in the front face of the coupling but to project outside of the aperture the required distance to form part of the interengaging seals between the two couplings.

The claims defining the invention are as follows:

We claim:

1. A fluid coupling comprised of two coupling members having hollow bodies interengageable the one with the other by means of lugs on each engaging shaped flanges on the other, and each having a sealing ring in an annular recess positioned to interengage the one with the other to sealingly place the hollow of one coupling member into communication with the hollow of the other coupling member, the improvement wherein each sealing ring comprises a compound sealing ring comprising (a) a resilient sealing portion having a rear part which engages in the said recess in its coupling member and having an outwardly directed part extending to engage the outwardly directed part of the other resilient sealing portion, said outwardly directed part having a circumferential groove, and (b) a rigid reinforcement portion on each said sealing ring encircling the outwardly directed part of each said resilient sealing portion, and engaged in the said groove to be axially confined thereby, each said sealing ring slidably engaging in the outer part of the said recess of that coupling member and extending to have its outer face in at least close proximity to the outer face of the other said rigid reinforcement portion, whereby to resist outward displacement of the two interengaging portions of the said resilient sealing portions.

2. A fluid coupling according to claim 1, wherein the said annular recess in each said body extends inwardly and outwardly from a cylindrical opening in that face of the said body which, when the couplings are interengaged, faces the engaging body, and the resilient sealing portion has a radially extending part fitting into the said annular recess and the outwardly directed part thereof extends through the cylindrical opening in the face of the said coupling, and the rigid reinforcement portion encircles the said outwardly directed part and fits into and extends outwardly from the said cylindrical opening.

3. A fluid coupling according to claim 1 or 2, wherein the said rigid reinforcement portion has its inner face of flattened V-shape to include an outwardly expanding inner surface, and the said groove in the said resilient sealing portion has a complementary shape.

4. A compound sealing ring for use in a fluid coupling member, comprising:
   (a) a resilient sealing portion having a radially extending inner end and an outwardly directed part of lesser diameter extending therefrom and having a circumferential groove in the lesser diameter part, and
   (b) a rigid reinforcement portion encircling the said outwardly directed part and axially confined on the said outwardly directed part by the said circumferential groove.

5. The method of fiting a compound sealing ring as claimed in claim 4 to a coupling member as defined in claim 1 which consists in first inserting the said radially extending part of the said resilient sealing portion into the said annular recess to allow the said outwardly directed part to project from the said annular recess, and then engaging the said rigid reinforcement portion over the said outwardly directed part to be axially confined by the said circumferential groove.

6. A compound sealing ring for insertion in use in a fluid coupling member having an internal annular recess, comprising: an annular resilient sealing member having front and rear ends, the rear end having a radially outwardly extending portion for insertion in an annular recess of the fluid coupling member, and means defining an annular groove around the outer periphery of the sealing member between the front and rear ends thereof; and an annular rigid reinforcement member inserted over the front end of the sealing member and snugly engaging in the annular groove, the reinforcement member being axially held in place by the sidewalls of the annular groove and having sufficient rigidity to prevent radial outward deformation of the sealing member in the region thereof which underlies the reinforcement member during use of the compound sealing ring.

7. A compound sealing ring according to claim 6; wherein the sealing member has a forwardly extending part extending forwardly of the radially outwardly extending portion and around which extends the annular groove, the forwardly extending part having a lesser internal diameter than that of the radially outwardly extending portion.

8. A compound sealing ring according to claim 7; wherein the engaging surfaces of the sealing member groove and the reinforcement member have generally flattened V-shaped complementary shapes.

9. A compound sealing ring according to claim 7; wherein the reinforcement member is composed of metal.

10. A compound sealing ring according to claim 6; wherein the engaging surfaces of the sealing member groove and the reinforcement member have generally flattened V-shaped complementary shapes.

11. A compound sealing ring according to claim 6; wherein the reinforcement member is composed of metal.

* * * * *